United States Patent [19]

Ishida

[11] 4,377,148
[45] Mar. 22, 1983

[54] FUEL MIXTURE HEATING DEVICE OF AN INTERNAL COMBUSTION ENGINE

[75] Inventor: Yasuhiko Ishida, Mishima, Japan

[73] Assignee: Toyota Jidosha Kogyo Kabushiki Kaisha, Toyota, Japan

[21] Appl. No.: 217,188

[22] Filed: Dec. 16, 1980

[30] Foreign Application Priority Data

Jan. 7, 1980 [JP] Japan .................... 55-000018[U]

[51] Int. Cl.³ .............................................. F02M 31/00
[52] U.S. Cl. ......................................... 123/549; 123/545; 219/207; 261/142
[58] Field of Search .............. 123/549, 545, 552; 219/205, 206, 207; 261/142

[56] References Cited

U.S. PATENT DOCUMENTS

| | | | |
|---|---|---|---|
| 1,424,898 | 8/1922 | Gorman | 123/549 |
| 1,456,018 | 5/1923 | Wiegand | 123/549 |
| 2,139,777 | 12/1938 | Skok et al. | 123/549 |
| 2,700,722 | 1/1955 | Gurley | 123/549 |
| 4,108,125 | 8/1978 | Marcoux | 123/549 |
| 4,141,327 | 2/1979 | Marcoux | 123/549 |
| 4,300,513 | 11/1981 | Ray | 123/545 |
| 4,308,845 | 1/1982 | Sarto | 123/549 |

Primary Examiner—Ronald H. Lazarus
Attorney, Agent, or Firm—Oblon, Fisher, Spivak, McClelland & Maier

[57] ABSTRACT

A fuel mixture heating device of an internal combustion engine having a downdraft type carburetor mounted on the collecting portion of the intake manifold. A hollow cylindrical body having a radially outwardly extending flange is arranged at the lower end of the air horn of the carburetor. A plurality of PTC elements is arranged to be in contact with the flange of the hollow cylindrical body for heating the inner wall of the hollow cylindrical body.

17 Claims, 11 Drawing Figures

FUEL MIXTURE HEATING DEVICE OF AN INTERNAL COMBUSTION ENGINE

DESCRIPTION OF THE INVENTION

The present invention relates to a fuel mixture heating device of an internal combustion engine.

Since the temperature of an engine is normally low before the completion of warm-up of the engine, the vaporization of the fuel fed from the carburetor is not fully promoted. As a result of this, since a large amount of the fuel is fed into the cylinder of the engine in the form of liquid fuel, good combustion cannot be obtained and, therefore, a problem occurs in that it is difficult to ensure a stable combustion of the engine. Consequently, in a conventional engine, in order to ensure stable combustion, a mixture, which is richer than the mixture fed into the cylinder after the completion of warm-up of the engine, is normally fed into the cylinder before the completion of warm-up of the engine. However, in the case wherein such a richer mixture is fed into the cylinder as in a conventional engine, problems occur in that the amount of harmful HC and CO components in the exhaust gas is increased and, in addition, specific fuel consumption of the engine is increased. Nevertheless, if it is possible to fully promote the vaporization of the mixture fed into the cylinder before the completion of warm-up of the engine, it is possible to obtain stable combustion, even if the air-fuel ratio of the mixture fed into the cylinder is increased. In addition, since it is possible to increase the air-fuel ratio of the mixture fed into the cylinder, the amount of harmful HC and CO components in the exhaust gas can be reduced and, also, specific fuel consumption can be improved. In order to promote the vaporization of the fuel before the completion of warm-up of the engine, a fuel vaporization promoting device has been known, in which the riser portion of the intake manifold is heated by the exhaust gas which is introduced to the riser portion from the exhaust system of the engine. However, in such a conventional fuel vaporization promoting device, in which the heat of the exhaust gas is used for promoting the vaporization of the fuel, there is a disadvantage in that it is difficult to promote the vaporization of the fuel immediately after the engine is started, because the temperature of the exhaust gas is not instantaneously increased after the engine is started. In order to eliminate the above disadvantage, a fuel vaporization promoting device has been proposed, in which a hollow cylindrical heater vessel is arranged in the lower end of the carburetor so as to be aligned with the air horn of the carburetor. A Positive Temperature Coefficient Thermister element (hereinafter referred to as a PTC element) is inserted into the heater vessel, and the inner wall of the heater vessel is heated by the heat of the PTC element. In this fuel vaporization promoting device, since a large part of the fuel fed from the carburetor flows on the inner wall of the heater vessel in the form of liquid fuel, the liquid fuel is concentrically heated by the heat issuing from the PTC element and, therefore, the vaporization of the liquid fuel can be sufficiently promoted. In such a fuel vaporization promoting device, the heater vessel comprises an inner pipe, an outer pipe and a PTC element inserted between the inner pipe and the outer pipe, and the PTC element is urged onto the outer wall of the inner pipe by the spring force of a spring member which is inserted between the PTC element and the outer pipe. However, even if the heater vessel is so constructed that the PTC element is urged onto the outer wall of the inner pipe by means of the spring member, as mentioned above, it is difficult to establish complete contact between the PTC element and the outer wall of the inner pipe and, therefore, it is difficult to ensure a high thermal conductivity between the PTC element and the outer wall of the inner pipe. In addition, in such a heater vessel, there are disadvantages in that the PTC element can be broken by the vibration of an engine, and in that, since the heater vessel has a complicated construction, the manufacturing cost of the heater vessel is increased.

An object of the present invention is to provide a reliable fuel mixture heating device which has a simple construction and is capable of fully promoting the vaporization of liquid fuel in such a way that a large part of the heat issued from the PTC element is used for heating the liquid fuel.

According to the present invention, there is provided a fuel mixture heating device of an internal combustion engine having an intake manifold and an intake passage which has an outlet connected to a collecting portion of the intake manifold, the intake passage having a fuel feed apparatus for feeding fuel into the intake passage, said device comprising: a power source; a hollow cylindrical body arranged at the outlet of the intake passage and aligned with the intake passage, said hollow cylindrical body having a substantially cylindrical inner wall and an outer wall which has a radially outwardly extending flange formed in one piece thereon, and; a heater arranged on said flange and connected to said power source.

The present invention may be more fully understood from the description of preferred embodiments of the invention set forth below, together with the accompanying drawings.

DESCRIPTION OF PREFERRED EMBODIMENTS

Figure 1:
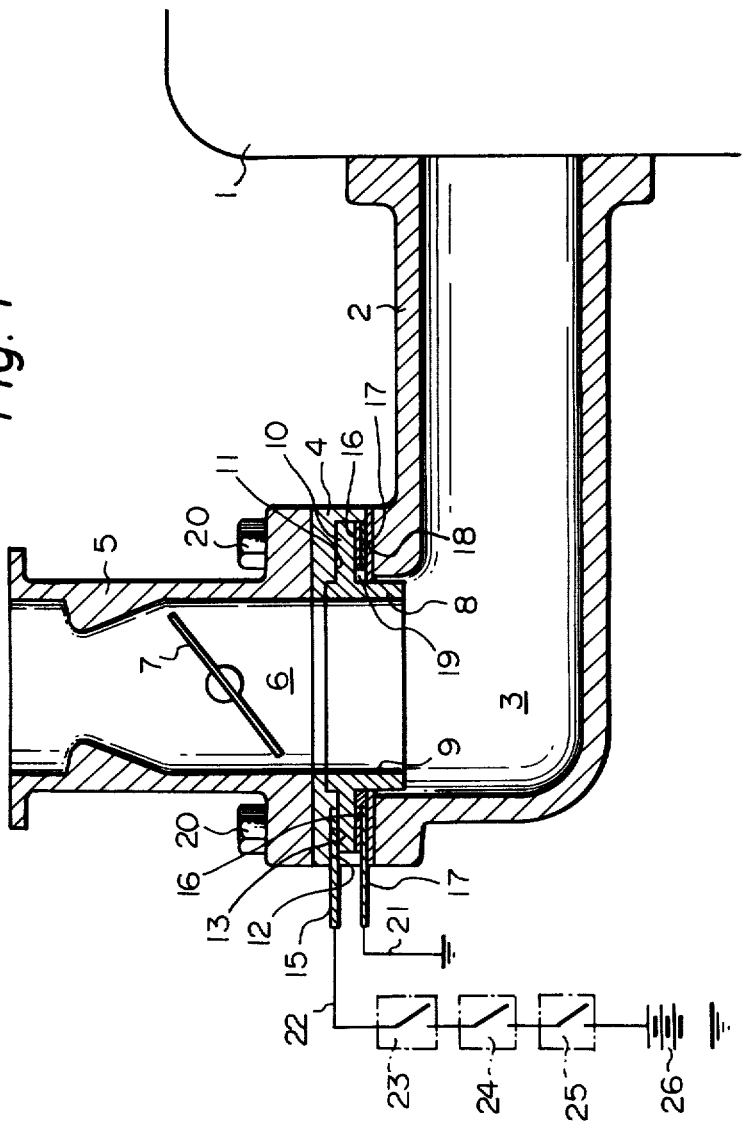
FIG. 1 is a cross-sectional side view of an intake system of an engine, illustrating an embodiment of a fuel mixture heating device according to the present invention.

Referring to FIG. 1, 1 designates an engine body, 2 an intake manifold, 3 a collecting portion of the intake manifold 2, and 4 a heat insulating plate; 5 designates a carburetor fixed onto the collecting portion 3 of the intake manifold 2 via the heat insulating plate 4, 6 an air horn of the carburetor 5, and 7 a throttle valve arranged in the air horn 6. As illustrated in FIG. 1, a hollow cylindrical body 8, made of a metallic material, is inserted into the heat insulating plate 4. The hollow cylindrical body 8 has a cylindrical inner wall 9 arranged to be aligned with the cylindrical inner wall of the air horn 6 and also has an outwardly projecting annular flange 10 formed in one piece on the circumferential outer wall thereof.

Figure 2:
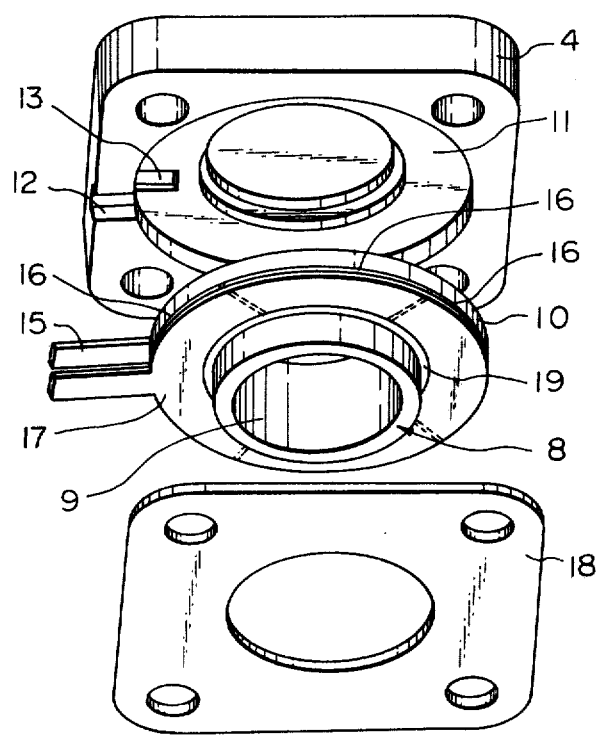
FIG. 2 is an explosive view of the heating device illustrated in FIG. 1.

As illustrated in FIGS. 1 and 2, an annular recess 11 is formed on the bottom wall of the heat insulating plate 4, and the annular flange 10 of the hollow cylindrical body 8 is fitted to the annular recess 11 of the heat insulating plate 4. In addition, a groove 12 is formed on the peripheral portion of the bottom wall of the heat insulating plate 4, and another groove 13, aligned with the groove 12, is formed on the bottom wall of the annular recess 11. An electrode plate 15, contacting the upper wall of the annular flange 10 of the hollow cylindrical body 8, is fitted into the grooves 12 and 13. Four sector shaped flat PTC elements 16, arranged in the form of an annular shape, are arranged on the bottom wall of the annular flange 10 of the hollow cylindrical body 8, and an annular electrode plate 17 is arranged on the bottom walls of the PTC elements 16. In addition, an annular electrical insulating plate 18, made of a resilient material, is arranged on the bottom wall of the annular electrode plate 17. Furthermore, an electrical insulating ring 19 is inserted between the hollow cylindrical body 8 and the inner end faces of the annular electrode plate 17 and the PTC elements 16. The PTC elements 16 and the annular electrode plate 17 are inserted into the annular recess 11 of the heat insulating plate 4 together with the annular flange 10 of the hollow cylindrical body 8 and, then, the heat insulating plate 4 is fixed onto the intake manifold 2 via the annular electrical insulating plate 18 by means of, for example, bolts 20. At this time, since the annular electrically insulating plate 18 is made of a resilient material, as mentioned previously, the annular electrical insulating plate 18 has a function of equalizing the fixing forces of the bolts 20, which act on the heat insulating plate 4, so that the entire upper face and the entire lower face of each of the PTC elements 16 uniformly contact the annular flange 10 and the annular electrode plate 17, respectively. In additive, in order to ensure a good electrical conductivity, it is preferable that the PTC elements 16 closely contact the annular flange 10 and the annular electrode plate 17 by using an adhesive having an electrical conductivity, and that the annular flange 10 also closely contact the electrode plate 15 by using such an adhesive.

As illustrated in FIG. 1, the annular electrode plate 17 is grounded via a lead 21, and the electrode plate 15 is connected to a power source 26 via a lead 22, a temperature reactive switch 23, a voltage reactive switch 24 and an ignition switch 25. The temperature reactive switch 23 is in the ON position when the temperature of the cooling water of the engine is lower than, for example, 60° C., while the temperature reactive switch 23 is turned to the OFF position when the temperature of the cooling water of the engine exceeds 60° C. The voltage reactive switch 24 is in the OFF position when the voltage, produced at the neutral point of the alternator (not shown) driven by the engine, is lower than a predetermined level, while the voltage reactive switch 24 is turned to the ON position when the voltage, produced at the neutral point of the alternator, is increased beyond the predetermined level.

As is known to those skilled in the art, a large amount of electric current flows within the PTC element 16 when the supply of the electric current is started. Consequently, during the time the starter motor (not shown) is operated for starting the engine, it is necessary that the supply of the electric current not be fed into the PTC element 16. To this end, the voltage reactive switch 24 is provided. That is, when the engine is compulsorily rotated by the starter motor, the voltage, produced at the neutral point of the alternator, is very low. On the other hand, when the engine begins to rotate under its own power, the voltage, produced at the neutral point of the alternator, is increased. As a result of this, the voltage reactive switch 24 is turned to the ON position and, thus, an electric current begins to be fed into the PTC element 16. When the feed of the electric current is started, as mentioned above, the temperature of the PTC element 16 is instantaneously increased and, as a result, the temperature of the hollow cylindrical body 8 is instantaneously increased.

When the engine is started, a large part of the fuel fed from the carburetor 5 flows downward on the inner wall of the air horn 6 in the form of liquid fuel and then flows downward on the inner wall 9 of the hollow cylindrical body 8. Consequently, the liquid fuel, flowing downward on the inner wall 9 is heated by the hollow cylindrical body 8 and, thus, vaporization of the liquid fuel is promoted. As illustrated in FIG. 1, the hollow cylindrical body 8 is not in contact with the intake manifold 2. Therefore, only an extremely small part of the heat issued from the PTC elements 16 escapes to the intake manifold 2 and the carburetor 5. Consequently, a large part of the heat issued from the PTC elements 16 is used for heating the hollow cylindrical body 8. In addition, the inner wall 9 of the hollow cylindrical body 8 is covered by the liquid fuel and, thus, a large part of the heat issued from the PTC elements 16 is used for promoting the vaporization of the liquid fuel.

When the temperature of the cooling water of the engine exceeds 60° C. a little while after the engine is started, the temperature reactive switch 23 is turned to the OFF position and, as a result, the supply of the electric current fed into the PTC elements 16 is stopped.

Figure 3:
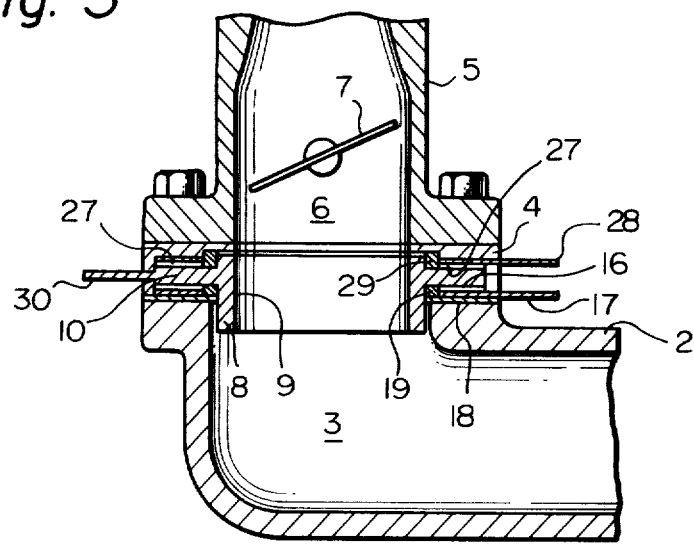
FIG. 3 is a cross-sectional side view of another embodiment according to the present invention.

FIG. 3 illustrates another embodiment. In this embodiment, additional PTC elements 27, arranged on the upper wall of the annular flange 10 of the hollow cylindrical body 8, are provided in addition to the PTC elements 16, and an additional annular electrode plate 28 is arranged on the upper faces of the PTC elements 27. In addition, an additional electrical insulating ring 29 is inserted between the hollow cylindrical body 8 and the inner end faces of the annular electrode plate 28 and the PTC elements 27. Both the annular electrode plates 17 and 28 are grounded, and a terminal 30, projecting outward from the outer wall of the annular flange 10, is connected to the temperature reactive switch 23 illustrated in FIG. 1. In this embodiment, since both the lower face and the upper face of the annular flange 10 of the hollow cylindrical body 8 are heated by the PTC elements 16 and 27, respectively, even if the thickness of the annular flange 10 is increased, it is possible to sufficiently heat the inner wall 9 of the hollow cylindrical body 8.

Figure 4:
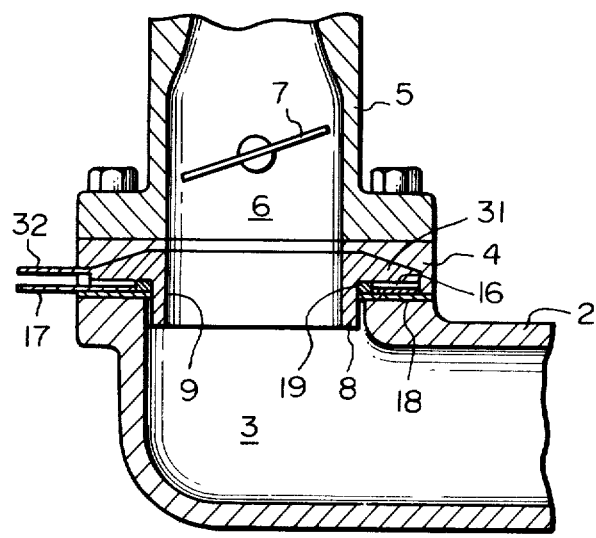
FIG. 4 is a cross-sectional side view of a further embodiment according to the present invention.

FIG. 4 illustrates a further embodiment. In this embodiment, the hollow cylindrical body 8 has a tapered annular flange 31 which is so formed that the thickness thereof is gradually reduced towards the peripheral edge thereof. An outwardly extending terminal 32 is formed on the peripheral outer wall of the tapered annular flange 31 and connected to the temperature reactive switch 23 illustrated in FIG. 1. In the case wherein the annular flange 31 is heated by the PTC elements 16, as in the present invention, it is necessary to effectively transfer heat to the inner wall 9 of the hollow cylindrical body 8. The amount of the heat flowing within the annular flange 31 becomes maximum at the root portion of the annular flange 31 and, therefore, in the case wherein the hollow cylindrical body 8 has a flat flange 10, as illustrated in FIG. 1, the flowing operation of the heat becomes most difficult at the root portion of the flange 10. Consequently, in the embodiment illustrated in FIG. 4, the annular flange 31 has a thickness which is gradually increased towards the root portion from the outer peripheral edge thereof so that the heat, issued from the PTC elements 16 is effectively transferred to the inner wall 9 of the hollow cylindrical body 8.

Figure 5:
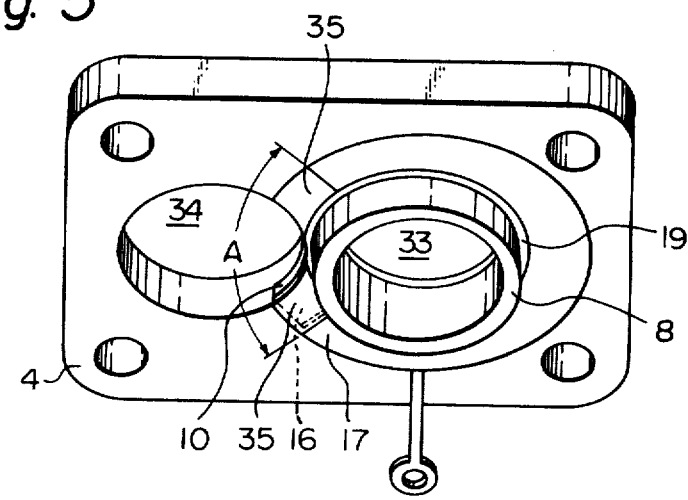
FIG. 5 is a perspective view of a still further embodiment according to the present invention.
Figure 6:
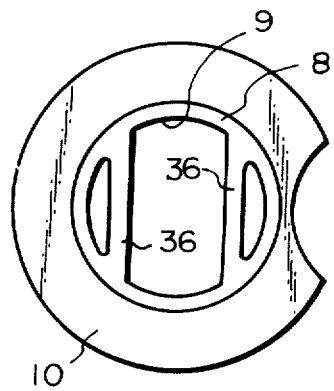
FIG. 6 is a plan view of a still further embodiment according to the present invention.
Figure 7:
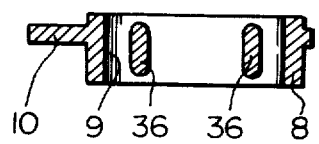
FIG. 7 is a cross-sectional side view of FIG. 6.
Figure 8:
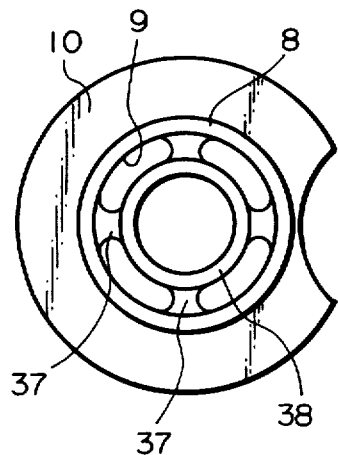
FIG. 8 is a plan view of a still further embodiment according to the present invention.
Figure 10:
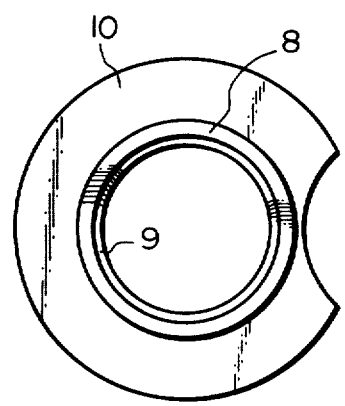
FIG. 10 is a plan view of a still further embodiment according to the present invention.
Figure 9:
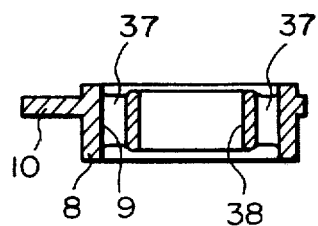
FIG. 9 is a cross-sectional side view of FIG. 8.
Figure 11:
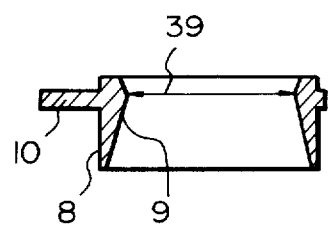
FIG. 11 is a cross-sectional side view of FIG. 10.

FIG. 5 illustrates the case wherein the present invention is applied to a carburetor comprising a primary carburetor and a secondary carburetor. In FIG. 5, reference numeral 33 designates a primary air horn of the primary carburetor, and 34 a secondary air horn of the secondary carburetor. In such a carburetor comprising the primary carburetor and the secondary carburetor, the distance between the primary air horn 33 and the secondary air horn 34 is normally very small. Consequently, as illustrated in FIG. 5, in the case wherein the hollow cylinder body 8 is arranged beneath the primary air horn 33, it is necessary to form an arch shaped cut away portion on the annular flange 10 of the hollow cylindrical body 8 as illustrated in FIG. 5. In addition, the PTC element 16 and the electrode plate 17 are not arranged in the region illustrated by A in FIG. 5, but a pair of electrical insulating plates 35 is inserted into the region A instead of arranging the PTC element 16 and the electrode plate 17 in the region A.

FIGS. 6 through 11 illustrate various embodiments of the hollow cylindrical body. In the embodiment illustrated in FIGS. 6 and 7, a pair of ribs 36 is formed in one piece on the inner wall 9 of the hollow cylindrical body 8. On the other hand, in the embodiment illustrated in FIGS. 8 and 9, a ring member 38, having a thin thickness and supported on the inner wall 9 of the hollow cylindrical body 8 via ribs 37, is arranged in the hollow cylindrical body 8. In the embodiments illustrated in FIGS. 6 through 9, since the fuel droplets, floating in the air-fuel mixture, are captured by the ribs 36 or the ring member 38 and vaporized, it is possible to further promote the vaporization of the fuel. In the embodiment illustrated in FIGS. 10 and 11, the hollow cylindrical body 8 is so formed that the thickness thereof is gradually reduced towards the upper end and the lower end thereof from the level of the annular flange 10 so that the heat is easily transferred to both the upper end and the lower end of the hollow cylindrical body 8. In addition, in the case wherein the portion of the inner wall 9, which is located near the annular flange 10, projects inward by increasing the thickness of the portion of the hollow cylindrical body 8, which is located near the annular flange 10, the separation of the mixture stream takes place on the inner wall 9 located downstream of a most restricted cross-sectional portion 39 and, thus, the velocity of the mixture stream flowing along the inner wall 9 is reduced. As a result of this, since the velocity of the liquid fuel flowing downward on the inner wall 9 is reduced, the length of time during which the liquid fuel is in contact with the inner wall 9 becomes long and, accordingly, the vaporization of the liquid fuel is promoted.

According to the present invention, since a large part of the heat issued from the PTC elements is used for heating liquid fuel, it is possible to fully promote the vaporization of the liquid fuel. Consequently, even if a fuel mixture, which is leaner than that used in a prior art, is used before the completion of warm-up of the engine, good combustion can be obtained and, thus, a stable operation of the engine can be ensured. In addition, since it is possible to use such a leaner mixture before the completion of warm-up of the engine, the amount of harmful components can be reduced, and specific fuel consumption can be reduced. In addition, in the present invention, the PTC element contacts the annular flange within a wide and flat contact area, and the PTC element also contacts the annular electrode plate within a wide and flat contact area. Furthermore, when the heat insulating plate is fixed onto the intake manifold by means of the bolts, the fixing force of the bolts uniformly acts on the entire contact area between the PTC elements and the annular flange and between the PTC elements and the annular electrode plate. As a result of this and the above-mentioned wide and flat contact area, it is possible to ensure a high thermal conductivity and a high electrical conductivity between the PTC elements and the annular flange and between the PTC elements and the annular electrode plate. In addition, since it is possible to use a flat PTC element which has a relatively high accuracy in size and can be easily manufactured, the irregularity in performance between fuel mixture heating devices becomes extremely small. Furthermore, since the flat PTC elements are held between the flat face of the annular flange and the flat face of the annular electrode plate, the PTC elements do not easily break. Even if the PTC elements break, since the PTC elements do not move from their initial position, breakage of the PTC elements does not have an influence on the heating operation of the hollow cylindrical body. In addition, since the fuel mixture heating device has a simple construction as a whole, it is possible to reduce the manufacturing cost and improve reliability.

While the invention has been described by reference to specific embodiments chosen for purposes of illustration, it should be apparent that numerous modifications could be made thereto by those skilled in the art without departing from the basic concept and scope of the invention.

I claim:

1. A fuel mixture heating device of an internal combustion engine having an intake manifold and an intake passage which has an outlet connected to a collecting portion of the intake manifold, the intake passage having a fuel feed apparatus for feeding fuel into the intake passage, said device comprising:
   a power source;
   a hollow cylindrical body arranged at the outlet of the intake passage and aligned with the intake passage, said hollow cylindrical body having a substantially cylindrical inner wall and an outer wall which has a radially outwardly extending flange formed in one piece thereon, and;
   a heater arranged on said flange and connected to said power source, wherein said heater comprises at least one PTC element arranged on said flange, and wherein said flange has a flat wall, and said PTC element has a generally flat shape and a flat face which is in contact with said flat wall.

2. A fuel mixture heating device as claimed in claim 1, wherein the flat wall of said flange comprises a radially outwardly extending flat wall portion which is in contact with the flat face of said PTC element.

3. A fuel mixture heating device as claimed in claim 2, wherein said flange has a thickness which is reduced towards the outer periphery of said flange.

4. A fuel mixture heating device as claimed in claim 2, wherein the flat wall of said flange comprises a pair of radially outwardly extending flat wall portions formed on each side of said flange, said PTC element being arranged on each of said flat wall portions.

5. A fuel mixture heating device of an internal combustion engine having an intake manifold and an intake passage which has an outlet connected to a collecting portion of the intake manifold, the intake passage having a fuel feed apparatus for feeding fuel into the intake passage, said device comprising:
a power source;
a hollow cylindrical body arranged at the outlet of the intake passage and aligned with the intake passage, said hollow cylindrical body having a substantially cylindrical inner wall and an outer wall which has a radially outwardly extending flange formed in one piece thereon, and;
a heater arranged on said flange and connected to said power source, wherein said heater is arranged on said flange via an adhesive layer having an electrical conductivity.

6. A fuel mixture heating device of an internal combustion engine having an intake manifold and an intake passage which has an outlet connected to a collecting portion of the intake manifold, the intake passage having a fuel feed apparatus for feeding fuel into the intake passage, said device comprising:
a power source;
a hollow cylindrical body arranged at the outlet of the intake passage and aligned with the intake passage, said hollow cylindrical body having a substantially cylindrical inner wall and an outer wall which has a radially outwardly extending flange formed in one piece thereon, and;
a heater arranged on said flange and connected to said power source,
wherein said device includes a heat insulating plate having a hole and inserted between the intake passage and the collecting portion of the intake manifold, said hollow cylindrical body being inserted into said hole, and wherein said device includes at least one annular electrode plate extending around the outer wall of said hollow cylindrical body and arranged in said heat insulating plate, said heater being arranged between said flange and said annular electrode plate.

7. A fuel mixture heating device of an internal combustion engine having an intake manifold and an intake passage which has an outlet connected to a collecting portion of the intake manifold, the intake passage having a fuel feed apparatus for feeding fuel into the intake passage, said device comprising:
a power source;
a hollow cylindrical body arranged at the outlet of the intake passage and aligned with the intake passage, said hollow cylindrical body having a substantially cylindrical inner wall and an outer wall which has a radially outwardly extending flange formed in one piece thereon, and;
a heater arranged on said flange and connected to said power source, wherein said device further comprises a first switch which is in the ON position when the temperature of the engine is lower than a predetermined temperature, and a second switch which is in the ON position when the engine is operating under its own power, said heater being connected to said power source via said first switch and said second switch, and wherein said second switch is operated in response to a change in voltage produced at a neutral point of an alternator which is driven by the engine.

8. A fuel mixture heating device of an internal combustion engine having an intake manifold and an intake passage which has an outlet connected to a collecting portion of the intake manifold, the intake passage having a fuel feed apparatus for feeding fuel into the intake passage, said device comprising:
a power source;
a hollow cylindrical body arranged at the outlet of the intake passage and aligned with the intake passage, said hollow cylindrical body having a substantially cylindrical inner wall and an outer wall which has a radially outwardly extending flange formed in one piece thereon, and;
a heater arranged on said flange and connected to said power source, wherein said heater is associated with means for permitting said heater to heat only said flange of said hollow cylindrical body.

9. A fuel mixture heating device as claimed in claim 1 or 5 or 6 or 7 or 8, wherein said flange is formed on the entire outer wall of said hollow cylindrical body.

10. A fuel mixture heating device as claimed in claim 6, wherein an electrical insulating plate, having a resiliency, is inserted between the heat insulating plate and the collecting portion of the intake manifold.

11. A fuel mixture heating device as claimed in claim 6, wherein said device comprises at least one electrical insulating ring inserted between the outer wall of said hollow cylindrical body and said PTC element and between the outer wall of said hollow cylindrical body and said annular electrode plate.

12. A fuel mixture heating device as claimed in claim 6, wherein said heat insulating plate has an annular recess formed around said hole, said flange being inserted into said annular recess together with said PTC element and said annular electrode plate.

13. A fuel mixture heating device as claimed in claim 6, wherein said heater is arranged between said flange and said annular electrode plate via an adhesive layer having an electrical conductivity.

14. A fuel mixture heating device as claimed in claim 6, wherein said flange has an arch shaped cut away portion, and an insulating plate, covering said PTC element and said annular electrode plate, is arranged in said cut away portion.

15. A fuel mixture heating device as claimed in claim 1 or 5 or 6 or 7 or 8, wherein the inner wall of said hollow cylindrical body has at least one radially inwardly projecting rib formed in one piece thereon.

16. A fuel mixture heating device as claimed in claim 1 or 5 or 6 or 7 or 8, wherein the inner wall of said hollow cylindrical body has an intermediate portion having a minimum diameter.

17. A fuel mixture heating device as claimed in claim 1 or 7 or 8 or 9 or 10, wherein the fuel feed apparatus comprises a carburetor, said intake passage being formed in said carburetor.

* * * * *